Aug. 4, 1959 G. A. LYON 2,898,150
WHEEL COVER
Filed June 3, 1955
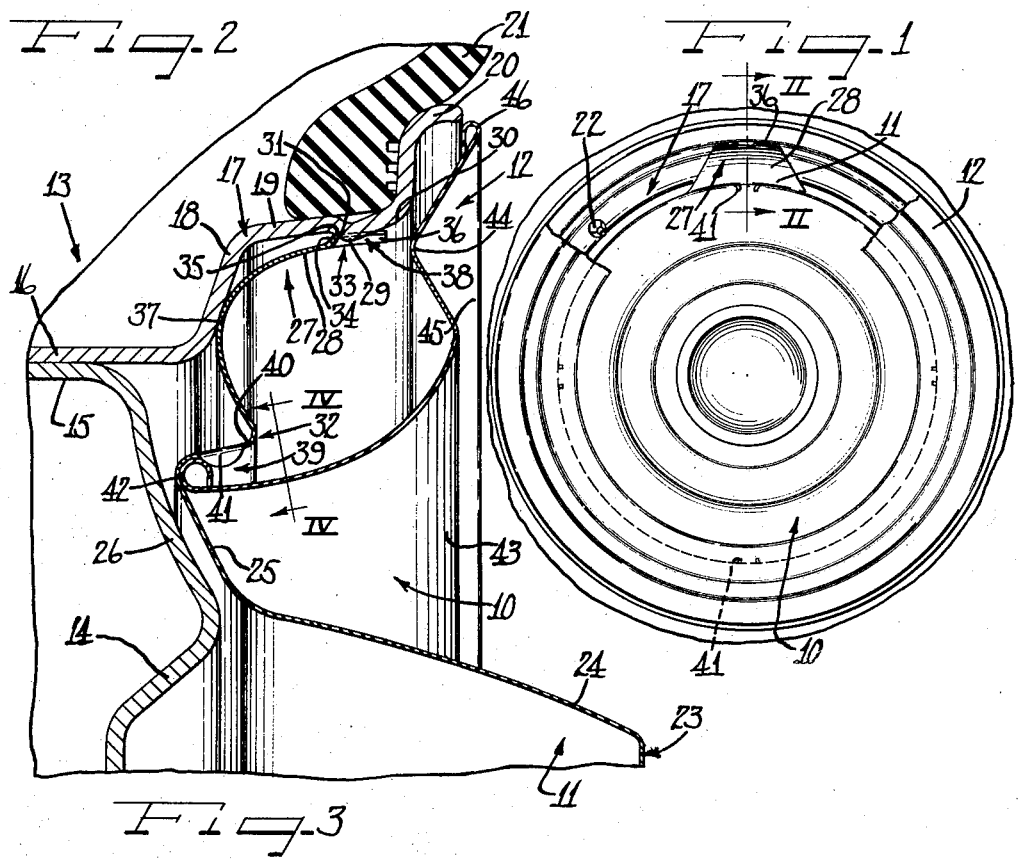
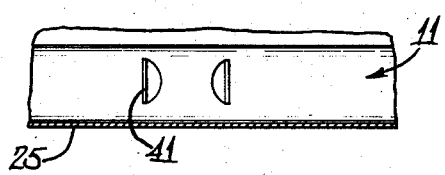
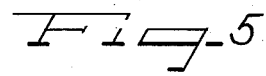
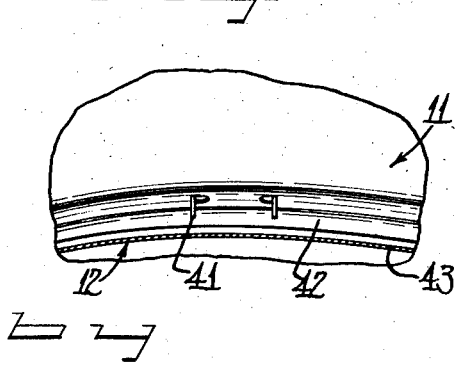
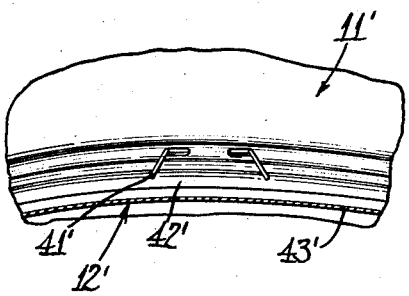
Inventor
George Albert Lyon

United States Patent Office 2,898,150
Patented Aug. 4, 1959

2,898,150

WHEEL COVER

George Albert Lyon, Detroit, Mich.

Application June 3, 1955, Serial No. 513,049

6 Claims. (Cl. 301—37)

The present invention relates to improvements in wheel structures and more particularly concerns the ornamental and protective covering of the outer sides of vehicle wheels.

An object of the present invention is to provide a wheel structure including a novel multi-part cover for the outer side thereof enabling the provision of a highly desirable deep draw contour giving a new ornamental effect.

It will be appreciated that there are limitations upon the depth to which sheet metal may be drawn without overstretching and rupturing of the material. Accordingly, in view of the present demand for unusually deep draw covers employing a high crown and being relatively massive in appearance, the instant novel two part cover construction has been evolved.

Accordingly, an object of this invention is to provide novel retaining means for a multi-part cover which has a deep axial draw giving a new ornamental effect.

Another object of this invention is to provide novel retaining means for maintaining a multi-part cover in assembled relation with the wheel.

A further object of this invention is to provide a highly simple multi-part cover including novel retaining means, which cover may be economically manufactured on large production basis.

Another object of this invention is to provide a cover construction which permits relatively free air movement therebehind.

Other objects, features and advantages of the present invention will be more readily apparent from the following detailed description taken in conjunction with the accompanying drawing illustrating several embodiments in which:

Figure 1 is a fragmentary side view of a wheel structure having a multi-part cover embodying features of this invention;

Figure 2 is an enlarged fragmentary cross sectional view taken on the line II—II of Figure 1 looking in the direction indicated by the arrows;

Figure 3 is a fragmentary enlarged radial view showing in detail the retaining tang construction;

Figure 4 is an enlarged fragmentary cross sectional view taken on the line IV—IV of Figure 2 looking in the direction indicated by the arrows; and Figure 5 is an enlarged fragmentary cross sectional view similar to Figure 4 showing a modification of the invention wherein the retaining tangs are of a more resilient construction.

The reference numeral 10 indicates generally my novel wheel cover and includes two separate parts, an inner or central high crown cover member 11 and an outer annular trim cover member 12 to be carried by the cover member 11.

The wheel cover 10 is arranged for disposition at the outer side of a vehicle wheel 13 including a wheel disk spider 14 provided with an axially inwardly extending outer flange 15 which is suitably secured to a base flange 16 of a drop center multi-flanged tire rim 17. From the outer side of the base flange 16 of the tire rim 17 extends generally radially outwardly a side flange 18 merging with a generally axially outwardly extending and radially outwardly sloping intermediate flange 19 from the outer side of which extends a generally radially outwardly and then axially outwardly turned terminal flange 20. The tire rim may support a tubeless tire 21, as is shown in Figure 2. As is seen in Figure 1, a valve stem 22 is carried by the tire rim 17 for inflating the tire 21.

According to the present invention the wheel cover 10 is constructed in two separable parts, with the cover member 11 engageable retainingly with the wheel in snap-on, pry-off relation, while the trim member 12 is engageable in snap-on, pry-off relation with the cover member 11 and serves to conceal the covering retaining means of the cover member 11.

By preference, the central cover member 11 is of generally circular form and of a diameter to overlie and conceal the juncture of the spider 14 and rim of the flange 17. The cover member 11 employs a high crown 23 of substantial width, a generally axially inwardly and radially outwardly sloping annular side wall 24 extending at its outer end from the crown 23 and at its inner end into an annular crown side wall 25 which is inclined radially and axially outward. It will be noted that the wheel disk spider 14 has an elongated intermediate slightly concave radially and axially inwardly extending flange 26. This flange 26, by virtue of its concave construction and its gradually merging into the flange 15 permits the use of a member 11 which has an unusually deeply extending draw thereby permitting a highly ornamental effect. Resilient clip means 27 for securing the cover member 11 to the wheel include a series of generally radially outwardly extending relatively resilient retaining clips or fingers or extensions 28 each retainingly engageable with a generally radially inwardly projecting retaining bump 29 provided on the radially inner margin of the intermediate flange 19. The bumps 29 may be formed by pressing the same radially inwardly in the intermediate flange 19 to provide a generally radially and axially inwardly sloping lead-in surface 30 and a generally undercut, axially and radially inwardly facing retaining shoulder 31 at the inner ends of the bumps. Preferably, the resilient retaining clips 28 are formed integral with the margin of the cover member 11. It is in this manner that the cover member 11 may be formed with a minimum waste of material.

The clips 28 project as extensions from an annular axially outwardly extending marginal extremity 32 of the cover 11. The clips 28 are arcuate and of concave cross section and when stressed into engagement with the wheel are adapted to bottom and bias against axial flange 18 of the rim flange.

Provided on the resilient clips 28 are radially indented notched-out U-shaped retaining elements 33 which are connected to the fingers 28 by radially and axially outwardly extending inclined relatively stiff gripping finger portions 34. When the clips are being applied on the wheel the inclined finger portion 34 on its axially inner surface serves to progressively cammingly flex the notched-out U-shaped elements 33 over bumps 29 to bottom therebehind. To this end, the U-shaped elements 33 include an edge 35 which is biased in face to face relationship against the shoulder 31. The notched-out U-shaped elements 33 also include two circumferentially spaced generally radially and axially extending extensions 36 which are adapted to prevent circumferential slippage of the cover member 11 relative to the wheel while thereon. These flanges 36 are joined together by the fingers 34. Thus, as will be best seen in Figure 2, the clips 28 are arranged to engage in shouldered generally radially

3 resiliently yieldable face-to-face relation with the outer marginal portion of the intermediate flange 19.

The fingers or extensions 27 each include a radial portion which generally speaking is the area of the finger or extension disposed radially inwardly of the point 37 where the finger or extension is bottomed against the tire rim flange 18. The fingers or extensions also each include an axial portion which generally speaking is the area of the finger or extension disposed radially and axially outwardly of the point 37 where the finger or extension is bottomed against the body part. Both of the portions on opposite sides of the point 27 of engagement of the finger against the rim flange 18 are freely flexible with respect to one another during the application of the cover to the wheel to adjust for different tolerances therebetween.

For retaining engagement of the clips 28 with the retaining bumps 29, the clips are formed so as to be of a larger diameter at their terminal portions than the inside diameter of the intermediate flange 19 carrying the retaining bumps 29. It will be noted that as the retaining edges 35 snap behind the retaining shoulders 31 of the retaining bumps, that an intermediate portion 37 of the retaining means 27 is bottomed against radial rim flange 18 thereby carrying the cover member 11 in resiliently tensioned bottomed engagement with the wheel.

It will be appreciated that by virtue of employing notched-out U-shaped elements 33 having a lead-in groove 38 between the extensions 36 it is possible to effect proper centering of the retaining fingers with the retaining bumps 29 during the application of the cover to the wheel.

It will be observed that the retaining fingers 28 are preferably of a substantial tapering structure with their maximum width at the base or juncture portions thereof with the cover margin 32.

After the inner or central cover member 11 has been mounted on the wheel, the outer annular trim member 12 is secured in place on the inner cover member in overlying relation to the tire rim and the retaining means 27. To this end, the annular cover member 12 is of a diameter to extend from spaced overlying relation to the terminal flange 20 of the tire rim to an inner diameter engageable within a groove indicated generally at 39.

The annular groove 39 is defined by the junction of flange 25 with a generally radially and axially outwardly extending flange 40 which has at its outer margin 32 the retaining clip means 27 provided thereon.

Preferably punched out of and formed integral with flange 40 in generally normally extending relation thereto are four sets of circumferentially spaced paired retaining tabs or tangs 41. It will be noted that the tabs 41 are formed in such a manner that they are cut out and deformed progressively away from the directly opposite tab. In other words, struck out shouldered portions 41 are formed and shown in the drawing in the form of tabs. Each of the tabs or struck out portions 41 is of a relatively short stiff construction for a purpose hereinafter further described.

For retaining the annular cover member 12 in snap-on, pry-off relation on the cover member 11, the inner margin of the cover member 12 is provided with an under turned generally radially outwardly projecting annular bead 42 retainingly engageable with the aforesaid pairs of tabs 41. Each of the aforesaid retaining tabs 41 has a generally axially inwardly and radially inwardly facing lead-in camming surface behind which the retaining bead 42 snaps over into bottomed relation between flanges 25 and 40. This relationship affords the additional advantage since radially outward pressure exerted by the tensioned retaining bead 42 against the retaining bumps 41 tends to exert a generally radially outward tension through the retaining means 27 and thus improves the retaining tensioned engagement thrust of the edges 35 against the retaining bumps shoulders 31. In addition,

4 this relationship permits a firmer bottoming of the clip cushioning portions 37 against the rim flange 18.

The retaining bead 42 is joined to a generally radially and axially outwardly arcuate annular resilient rib 43 which is in turn joined to an axially inwardly positioned annular reinforcing rib 44 which in assembly lies generally opposite the juncture of the terminal and intermediate flanges of the tire rim. From the rib 44 the outer marginal portion 45 of the cover 12 extends generally radially and axially outwardly in overlying relation to the terminal flange 20 and is provided with a radially outer marginal under turned reinforcing and finishing bead 46.

Application of the cover member 12 to the assembled inner cover member 11 is effected by pressing the stiff bead 42 progressively over and behind the retaining tabs 41. In so doing, the resilient rib 43 is progressively tensioned. Removal of the trim cover member 12 is effected by inserting a pry-off tool beyond the outer marginal portion thereof into pry-off engagement with the outer marginal bead 46 and then into pry-off engagement with the reinforcing and pry-off rib 44. Leverage exerted by the pry-off tool causes the retaining bead 42 at the inner margin of the trim ring cover member 12 to snap out of retaining engagement with the retaining tabs 41. Thereafter, the cover member 11 can be removed from the wheel as previously described.

The inner cover member 11 and the outer cover member 12 including respective deeply axially projecting flanges 24 and 43 define therebetween in assembly a relatively deeply inset axial draw. This draw possesses highly ornamental qualities now in considerable demand by industry.

In the present instance, the valve stem 22 is enclosed by the cover member 12. Access to the valve stem can be had readily by removal of the trim cover member 12.

In the modification of Figure 5, the circumferentially spaced pairs of tabs 41' are preferably formed integral with cover member 11' for reasons of economy and are of a longer more flexible or resilient construction and extend in diverging angled relation to one another. In this instance the rib 43' is of a more sturdy construction and upon application of the trim 12' to the cover member 11' the resilient tabs 41' are progressively divergently flexed to permit the bead 42' to become engaged therebehind in assembled relation. It will be appreciated that after the bead 42' becomes lodged behind the diverging flexed tabs 41' that the tabs will return to their normal position thereby permitting a firm interlocking engagement of the bead behind the tabs.

It will be understood that modifications and variations may be had without departing from the novel concepts of the present invention.

I claim:

1. In a wheel structure including body and flanged rim parts with circumferentially spaced cover retaining bumps on an axial rim flange of said rim part, a wheel cover member overlyingly disposed at the outer side of the wheel and having generally radially and then generally axially extending resiliently deflectable cover retaining extensions extending from said cover and said extensions being provided with radially angled fingers having edges for retaining engagement behind said bumps to interlock said cover on the wheel, said extensions each including radial and axial portions which are freely flexible relative to one another with the radial portion connected at its radially inner end to the outer margin of the cover and with the axial portion confronting the axial rim flange and being notched at its axially outer end with portions of the material cut from the notches turned radially outwardly and forming said radially angled fingers, said radial extension portions being stressed rearwardly against a flange of said rim part to wedge said angled fingers against the rear surfaces of said bumps.

2. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face to face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, and a portion of said cover being bottomed against said wheel to backup the engagement of said free edge with said axial flange portion, said portion of said cover being bottomed against said wheel comprising an intermediate portion of said fingers disposed at the area of the junction of said radial and axial portions.

3. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face to face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, and a portion of said cover being bottomed against said wheel to backup the engagement of said free edge with said axial flange portion, said axial portion of said finger having struck-out there from generally radially and axially outwardly extending short stiff extensions arranged in a common circle having a diameter slightly larger than the diameter of the axial flange portion for retaining engagement therewith.

4. The wheel structure of claim 3 further characterized by bumps protruding from the axial portion of the wheel and with the axially outer end of said axial finger portion being notched for the receipt of said bump with the sides of the notch bearing against the circumferentially spaced sides of the bump to insure corotation and with the extensions bearing against the axially inner side of the bumps.

5. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face to face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, and a portion of said cover being bottomed against said wheel to backup the engagement of said free edge with said axial flange portion, the axial finger portions of said fingers being notched providing notched areas and with said axial flange portion on the wheel having radially protruding bumps with the bumps engaged in assembly with the notched areas.

6. The wheel structure of claim 5 further characterized by the margin of the cover having an annular radially inwardly facing area provided with circumferentially spaced tabs turned radially inwardly, and a trim member concealing the fingers having its inner marginal area deflected over the tabs in assembly therewith.

References Cited in the file of this patent

UNITED STATES PATENTS

| | | |
|---|---|---|
| 2,600,411 | Lyon | June 17, 1952 |
| 2,600,412 | Lyon | June 17, 1952 |
| 2,650,135 | Lyon | Aug. 25, 1953 |
| 2,669,487 | Horn | Feb. 16, 1954 |